United States Patent [19]
Michaels

[11] Patent Number: 4,972,543
[45] Date of Patent: Nov. 27, 1990

[54] ULLAGE ROD CLEANER

[76] Inventor: Homer Michaels, 2509 Mountain Quail Way, Modesto, Calif. 95355

[21] Appl. No.: 409,345

[22] Filed: Sep. 19, 1989

[51] Int. Cl.⁵ .............................................. F01M 11/12
[52] U.S. Cl. ................................................. 15/210 B
[58] Field of Search .............. 15/210 B, 244.1, 210 A, 15/, 218.1

[56] References Cited

U.S. PATENT DOCUMENTS

| | | | |
|---|---|---|---|
| 1,759,788 | 5/1930 | Holveck | 15/210 B |
| 1,916,933 | 7/1933 | Peck | 15/210 B |
| 2,470,484 | 5/1949 | Gall | 15/210 B |
| 2,529,825 | 11/1950 | Felton | 15/210 B X |
| 2,810,923 | 10/1957 | Desso | 15/210 B |
| 4,023,231 | 5/1977 | Haber | 15/210 B |
| 4,374,445 | 2/1983 | Wilson | 15/210 B |
| 4,380,841 | 4/1983 | Thomas | 15/210 B |

FOREIGN PATENT DOCUMENTS 2919883 11/1979 Fed. Rep. of Germany .... 15/210 B

*Primary Examiner*—Chris K. Moore
*Attorney, Agent, or Firm*—T. M. Gernstein

[57] ABSTRACT

An ullage rod cleaning device includes a unitary, one-piece metal case and a unitary, one-piece foam rubber insert. The case includes brackets that are in abutting contact with edges of the insert, and has a magnet mounted thereon.

3 Claims, 1 Drawing Sheet

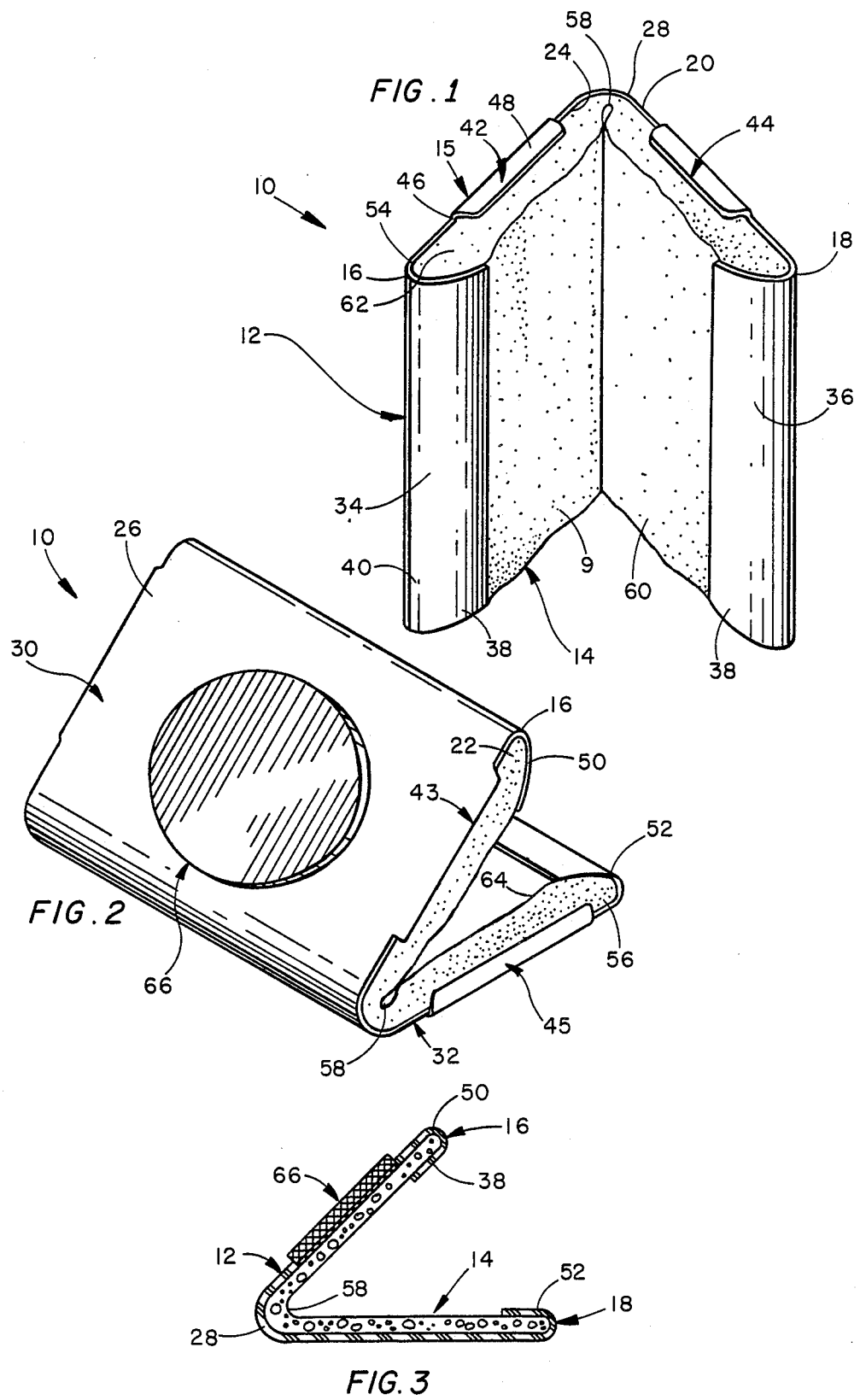

ULLAGE ROD CLEANER

TECHNICAL FIELD OF THE INVENTION

The present invention relates to the general art of hand tools, and to the particular field of ullage rods.

BACKGROUND OF THE INVENTION

Many people work on their own automobiles or other internal combustion engines. One item that is often checked and monitored is the level and condition of lubricating and transmission fluids in the engine.

Such fluid levels and conditions are generally monitored using an ullage rod that is first withdrawn and cleaned, and is then dipped into the fluid-containing reservoir and again withdrawn. A common, and frustrating, occurrence in this process is the absence of an element for wiping and cleaning the ullage rod. Many people even resort to wiping the rod on their clothes.

Therefore, there have been several proposals for ullage rod cleaning devices. However, these devices still have a drawback in that they are often not easily manufactured in a mass production type process, as by stamping or the like. Therefore, these items have not achieved full commercial acceptance.

Therefore, there is a need for an ullage rod cleaning device which is amenable to mass production techniques.

OBJECTS OF THE INVENTION

It is a main object of the present invention to provide an ullage rod cleaning device.

It is another object of the present invention to provide an ullage rod cleaning device that is also amenable to mass production techniques.

SUMMARY OF THE INVENTION

These, and other, objects are achieved by providing an ullage rod cleaning device that includes a unitary, one-piece metal body which is in an easily formed shape and an insert element which is also in an easily formed shape.

BRIEF DESCRIPTION OF THE FIGURES

FIG. 1 is a perspective view of an ullage rod cleaning device embodying the present invention in the open condition.

FIG. 2 is a perspective view of an ullage rod cleaning device embodying the present invention in the partially closed condition.

FIG. 3 is an end elevational view of the device.

DETAILED DESCRIPTION OF THE PREFERRED EMBODIMENT OF THE INVENTION

Shown in the figures is an ullage rod cleaning device 10 which includes a unitary, one piece outer metal case 12 and a unitary, one-piece absorbent insert element 14 removably contained therein. The one piece nature of the elements makes the device 10 easily amenable to a mass production process such as stamping or the like, and the metal nature of the case even further enhances this advantage. The insert element is preferably foam rubber or the like which can be easily cut in such a mass production process.

The case 12 includes a central body 15 that is polygonal, preferably rectangular, in shape and which includes first and second end edges 16 and 18 and first and second side edges 20 and 22. The body includes an inner surface 24 and an outer surface 26, and is medially divided with respect to the end edges by a spine-forming crease 28 which extends from the first side edge to the second side edge. The spine forming crease is located midway between the end edges 16 and 18 to divide the case into two essentially equal sections 30 and 32, and permits the case to be folded over itself so that the sections can overly each other in a closed condition. The case is formed of material that will form a living hinge when creased at the spine-forming crease so the case can be opened and closed a multitude of times. Plastic is a suitable material, although some metals, such as aluminum, can also be used.

The case 12 further includes first and second U-shaped end brackets 34 and 36 respectively on end edges 16 and 18. The end brackets form a portion of the end edges and thus, since the case is one-piece form a continuation of the case at the end edges. The central body of the case forms one leg of the U-shape and the second leg 38 of each bracket extends at an angle with respect to the central body and is connected thereto by a bight section, such as section 40 of bracket 34. The end brackets extend for essentially the entire width of the case as measured between side edges 20 and 22.

The case further comprises four side brackets, including first side brackets 42 and 43 on sides 20 and 22 midway between the crease 28 and the end edge 16, and second side brackets 44 and 45 located on the sides 20 and 22 midway between the crease 28 and the end edge 18.

Each side bracket is L-shaped and has a short leg, such as leg 46 on bracket 42 connected to the central body and a long leg, such as leg 48 on bracket 42, extending essentially perpendicular to the plane containing the central body side edge, such as side edge 20, associated therewith.

The insert element 14 is polygonal in shape, preferably rectangular, to correspond in size and shape to the case 12. The insert element includes first and second end edges 50 and 52 that lie in abutting contact with the end brackets 34 and 36 when the insert is contained in the case as shown in the Figures, and first and second side edges 54 and 56 that are in abutting contact with the side brackets when the insert element is contained in the case as shown.

The insert element further includes a spine forming crease 58 that extends across the entire width of the insert element as measured between the side edges 54 and 56 and which is positioned midway between the end edges 50 and 52 to overly the case spine-forming crease 28 when the insert element is contained in the case. The insert element crease thus divides the insert element into two essentially equal sections 59 and 60 which overlie case sections 30 and 32 respectively.

The insert element includes a first surface 62 that is in abutting contact with the inner surface of the case element and a wiping surface 64 that is in position to wipe an ullage rod when that rod is inserted between the sections of the insert element.

A circular magnet 66 is fixedly mounted on the outer surface of the case as is best shown in FIG. 2. This magnet will permit the device to be attached to a convenient location on the vehicle, such as a hood or fender or the like.

It is understood that while certain forms of the present invention have been illustrated and described herein, it is not to be limited to the specific forms or arrangements of parts described and shown.

I claim:

1. An ullage rod cleaner comprising:
   (A) a unitary, one-piece case which includes
   (1) a central polygonal body having first and second end edges, firs and second side edges, an inner surface and an outer surface, a spine-forming crease defined to extend from said first side edge to said second side edge to be located midway between said first and second end edges to divide said central body into essentially equal first and second sections,
   (2) first and second end brackets on said first end edge and said second end edge respectively, each of said first and second end brackets being U-shaped with said central body forming one leg of the U-shape and having a second leg of the U-shape extending at a skewed angle with respect to said central body and having a curved bight section connecting said second leg to said central body,
   (3) first and second side brackets on each of said first and second central body side edges, each of said side brackets being locate midway between said spine-forming crease and one of said central body end edges and being L-shaped with a short leg which is connected to said central body and extending outwardly therefrom in a plane containing said central body and a long leg which extends essentially perpendicular to the plane containing said central body and extending from the side edge associated therewith, and
   (4) said spine-forming crease permitting said central body first and second sections to overly each other, said spine-forming crease being flexible and forming a living hinge which can be flexed a multitude of times to permit said body first and second sections to be opened and closed a multitude of times, said first and second side brackets being located midway between said spine-forming crease and said first and second end edges respectively;
   (B) a unitary, one-piece insert element removably contained in said case and which includes
   (1) a rectangular foam rubber body having first and second end edges each located in abutting contact with one of said body first and second end bracket respectively, first and second side edges located in abutting contact with said first and second side brackets respectively, and
   (2) a spine-forming crease defined to extend from said insert body first side edge to said insert body second side edge and to be located midway between said insert body first and second end edges to divide said insert body into two essentially equal sections and permitting said insert body first and second sections to overly each other, said insert element spine-forming crease overlying said case spine-forming crease; and
   (C) a circular magnet fixedly mounted on said case body outer surface.

2. The ullage rod cleaner defined in claim 1 wherein said case is formed of plastic material.

3. The ullage rod cleaner defined in claim 1 wherein said case is formed of metal.

* * * * *